United States Patent [19]
Cheng

[11] Patent Number: 6,034,871
[45] Date of Patent: Mar. 7, 2000

[54] HEAT DISSIPATION CASSETTE FOR A NOTEBOOK PERSONAL COMPUTER

[75] Inventor: Ho-Pin Cheng, Taipei, Taiwan

[73] Assignee: Auras Technology Ltd., Taipei, Taiwan

[21] Appl. No.: 09/299,737

[22] Filed: Apr. 27, 1999

[51] Int. Cl.⁷ .................................................. H05K 7/20
[52] U.S. Cl. ...................... 361/695; 361/687; 361/715; 165/104.34; 165/165
[58] Field of Search .................. 361/683, 685–689, 361/694–699, 690, 715; 165/80.2, 80.3, 80.4, 165, 121–126, 58, 104.33, 104.34; 415/208, 208.1, 208.2, 208.3, 203; 364/708.1; 429/26, 27

[56] References Cited

U.S. PATENT DOCUMENTS 5,862,037  1/1999  Behl ........................................ 361/687
5,898,568  4/1999  Cheng ..................................... 361/695

*Primary Examiner*—Leo P. Picard
*Assistant Examiner*—Michael Datskovsky
*Attorney, Agent, or Firm*—Watson Cole; Grindle Watson PLLC

[57] ABSTRACT

A heat dissipation cassette to be installed in the battery chamber of a notebook PC for cooling down the interior operational temperature of the notebook PC is disclosed. The heat dissipation cassette includes a cassette body that defines an air supply channel and an air exhaust channel. The air supply channel and the air exhaust channel are aligned with an air supply opening and an air exhaust opening defined in the endwall of the notebook PC, when the heat dissipation cassette is installed in the battery chamber. A supply fan is mounted in the air supply channel to supply cool air into the notebook PC through the air supply channel and the air supply opening. An exhaust fan is arranged in the air exhaust channel to exhaust hot air out of the notebook PC through the air exhaust opening and the air exhaust channel.

6 Claims, 7 Drawing Sheets

HEAT DISSIPATION CASSETTE FOR A NOTEBOOK PERSONAL COMPUTER

BACKGROUND OF THE INVENTION

1. Field of the Invention

The present invention relates to a heat dissipation cassette, and more particularly, to a heat dissipation cassette which is installed in a notebook PC (personal computer) to take cool air into the notebook PC to cool down the electronic components therein and exhaust hot air out of the notebook PC.

2. Description of Related Art

The notebook PC has been widely used because of its powerful processing capability and portability. To maintain the size of the notebook PC to be as small as possible, the notebook PC usually does not have a cooling fan that is often used in a desktop PC for heat dissipation. Consequently, the notebook PC may encounter difficulty in heat dissipating. Particularly, when the notebook PC operates for a long time with power supplied by an external power adapter, excess heat generated by the electronic components in the notebook PC cannot be effectively dissipated. Therefore, as shown in FIG. 7, a conventional heat dissipation device (100) is provided to assist in cooling down the electronic components in a notebook PC (200). This conventional heat dissipation device (100) has a hollow body (110) adapted to be installed in the PCMCIA slot (210) of the notebook PC (200). A fan (130) is provided at one end of the body (110) such that cool air can be supplied into the notebook PC (200) via an opening (140) in the other end of the body (110) thereby cooling down the electronic components of the notebook PC (200). However, such a heat dissipation device (100) can only supply air into the notebook PC (200), while the hot air inside the notebook PC (200) is difficult to be exhausted. Therefore, the heat dissipation efficiency is low and there is a continuing need for the above heat dissipation device to be improved.

SUMMARY OF THE INVENTION

The objective of the present invention is to provide a heat dissipation cassette to be installed in a notebook PC, which is able to blow cool air into the notebook PC to cool down the electronic components therein and exhaust hot air out of the notebook PC.

To achieve the objective, the heat dissipation cassette in accordance with the present invention has a cassette body shaped to fit into the battery chamber of the notebook PC. The cassette body has an air supply channel and an air exhaust channel defined therein. A supply fan is mounted in the air supply channel to supply cool air into the notebook PC. An exhaust fan is mounted in the air exhaust channel to exhaust hot air out of said notebook PC.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
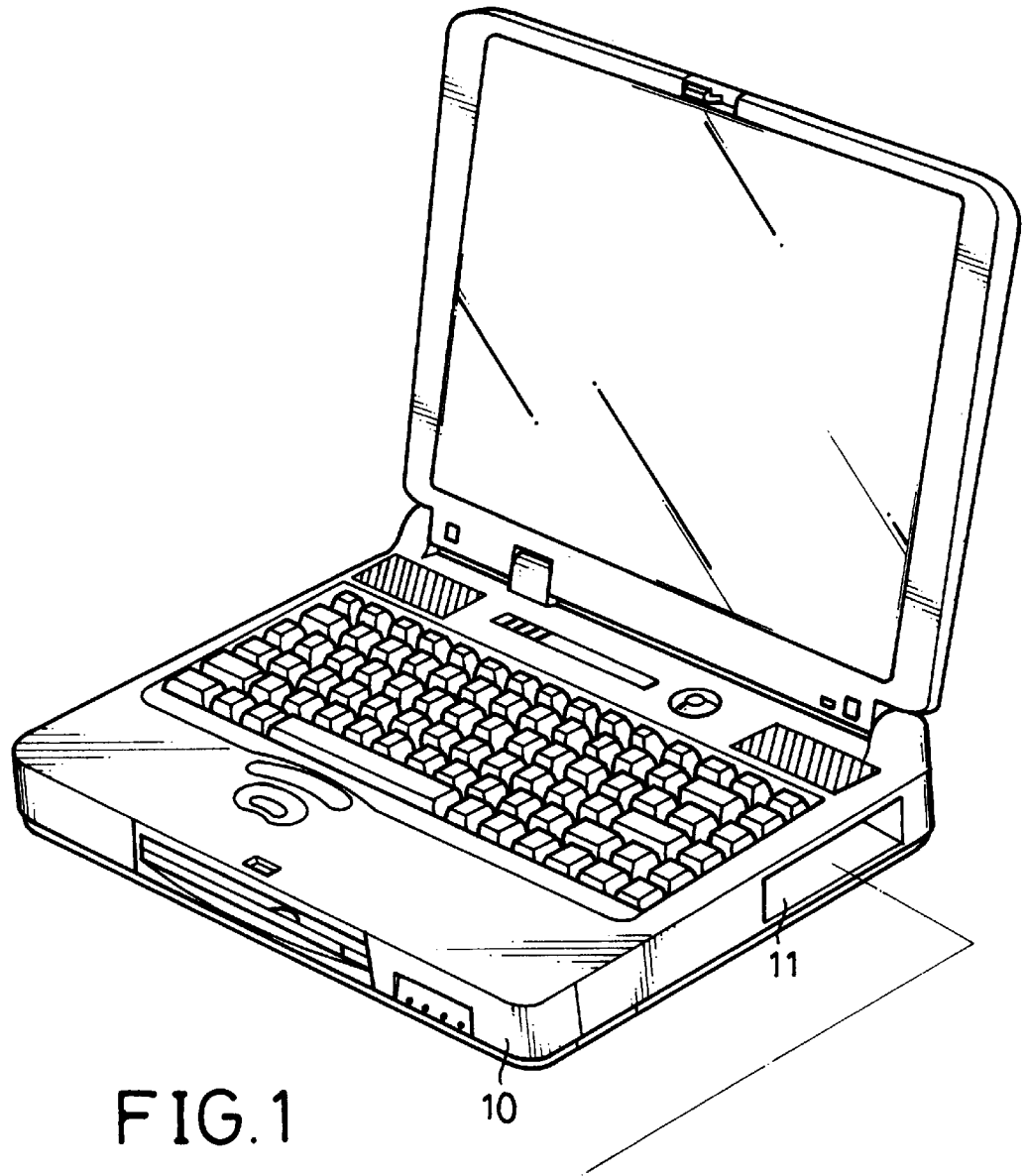
FIG. 1 is an exploded perspective view of a notebook PC showing how to use the heat dissipation cassette in accordance with the present invention.
Figure 1:
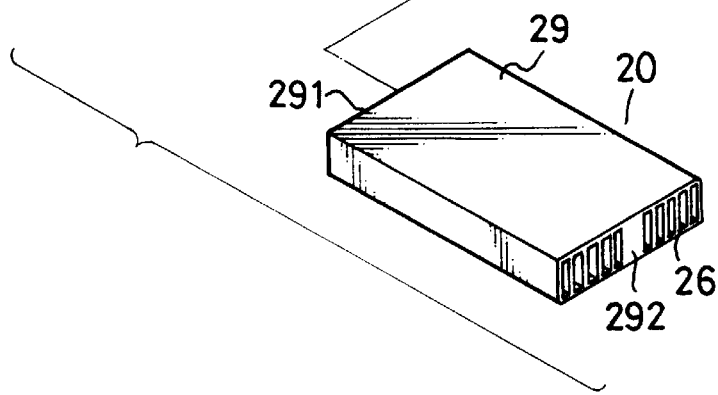

The heat dissipation cassette in accordance with the present invention is used with a notebook PC that is powered by an external power adapter so that the battery chamber of the notebook PC can be utilized to hold the heat dissipation cassette. As shown in FIG. 1, the heat dissipation cassette (20) has a rectangular cassette body (29) which is shaped to fit into the battery chamber (11) of the notebook PC (10).

Figure 2:
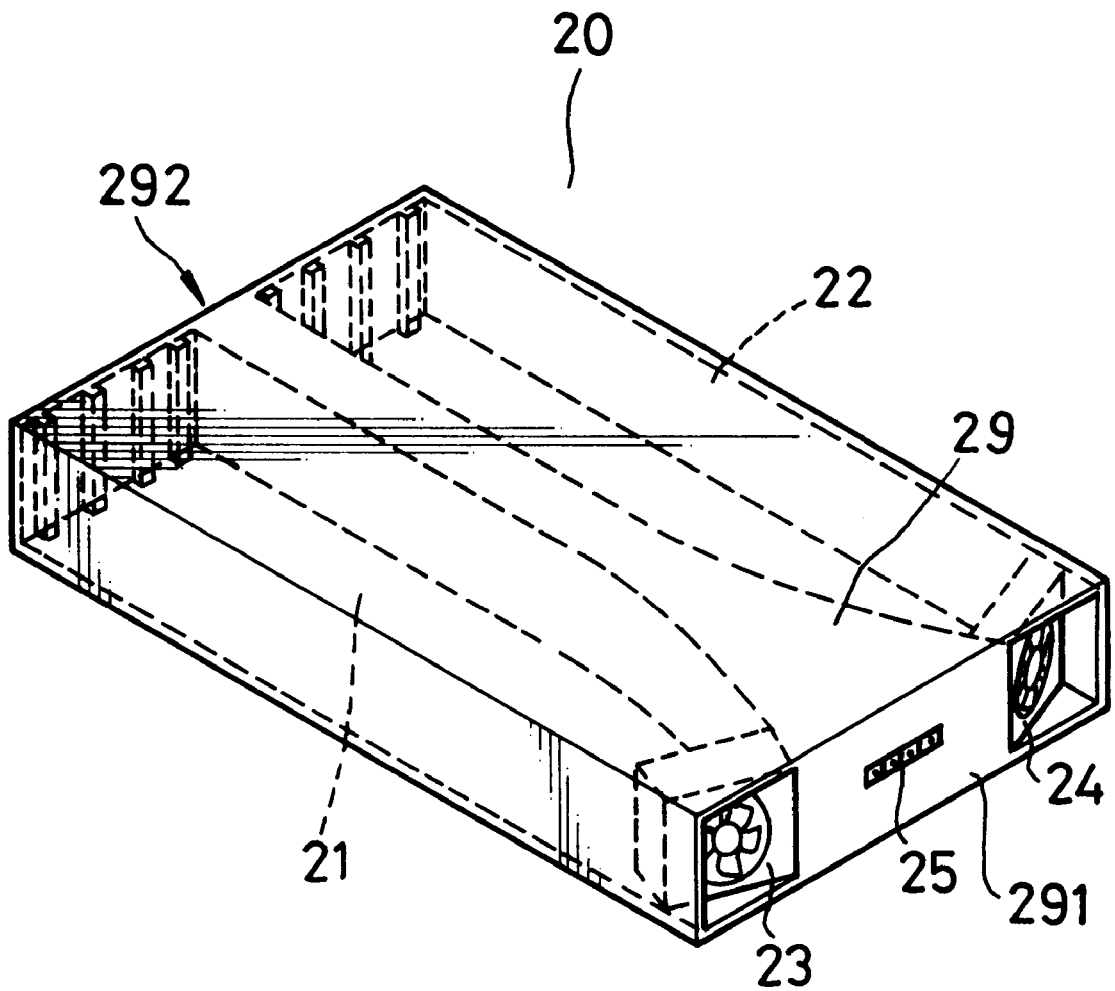
FIG. 2 is a perspective view of a preferred embodiment of the heat dissipation cassette in accordance with the present invention.

With reference to FIG. 2, the cassette body (29) has an inner face (291) and an outer face (292) opposite to the inner face (291), and the heat dissipation cassette (20) defines an air supply channel (21) and an air exhaust channel (22) in the cassette body (20) between the inner face (291) and the outer face (292) so that air can flow through the cassette body (29). The two channels (21, 22) are independent and substantially parallel with each other. A supply fan (23) and an exhaust fan (24) are arranged in the air supply channel (21) and the air exhaust channel (22), respectively. In this preferred embodiment, the two fans (23, 24) are located at the ends of the air supply channel (21) and the air exhaust channel (22) on the inner face (291). The other ends of the air supply channel (21) and the air exhaust channel (22) are provided with grill bars (26) to prevent undesired objects from entering the channels (23, 24). The supply fan (23) and exhaust fan (24) are preferably of the same type, such as DC brushless fans, but rotate in different directions so that the supply fan (23) can blow cold air into the notebook PC (10) and the exhaust fan (24) can exhaust hot air out of the notebook PC (10).

Figure 3:
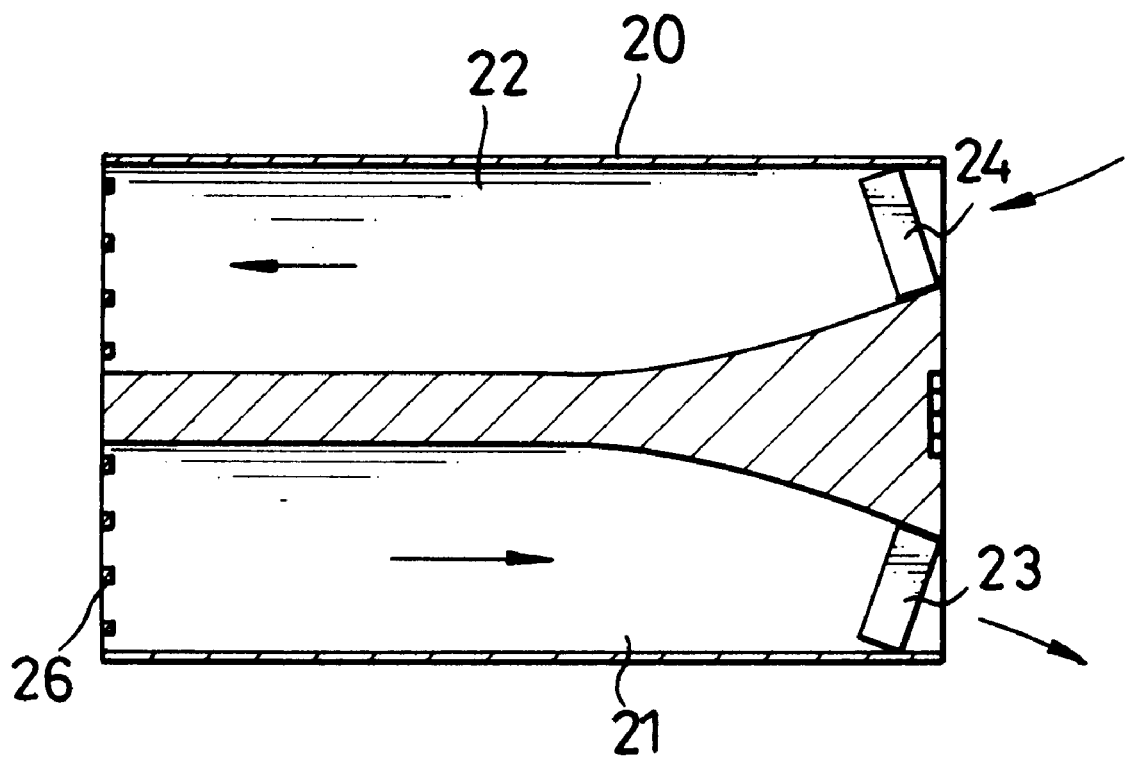
FIG. 3 is a top plan view showing the internal structure of the heat dissipation cassette shown in FIG. 2 and the direction of air flow in the heat dissipation cassette.

In order to keep the flow of the cold air and the hot air separated to enhance the heat dissipation efficiency, as shown in FIG. 3, the supply fan (23) and the exhaust fan (24) are oriented to face in divergent directions. Therefore, the cold air flow generated by the supply fan (23) and the hot air flow generated by the exhaust fan (24) do not interfere with each other.

With reference to FIG. 2 again, the heat dissipation cassette (20) has a power connector (25) provided on the inner face (291) of the cassette body (29). The power connector (25) is plugged into a power supply socket (not shown) in the battery chamber (11) of the notebook PC (10) when the heat dissipation cassette (20) is installed in the battery chamber (11) so that necessary power can be supplied from the notebook PC (10) to the fans (23, 24).

Figure 4:
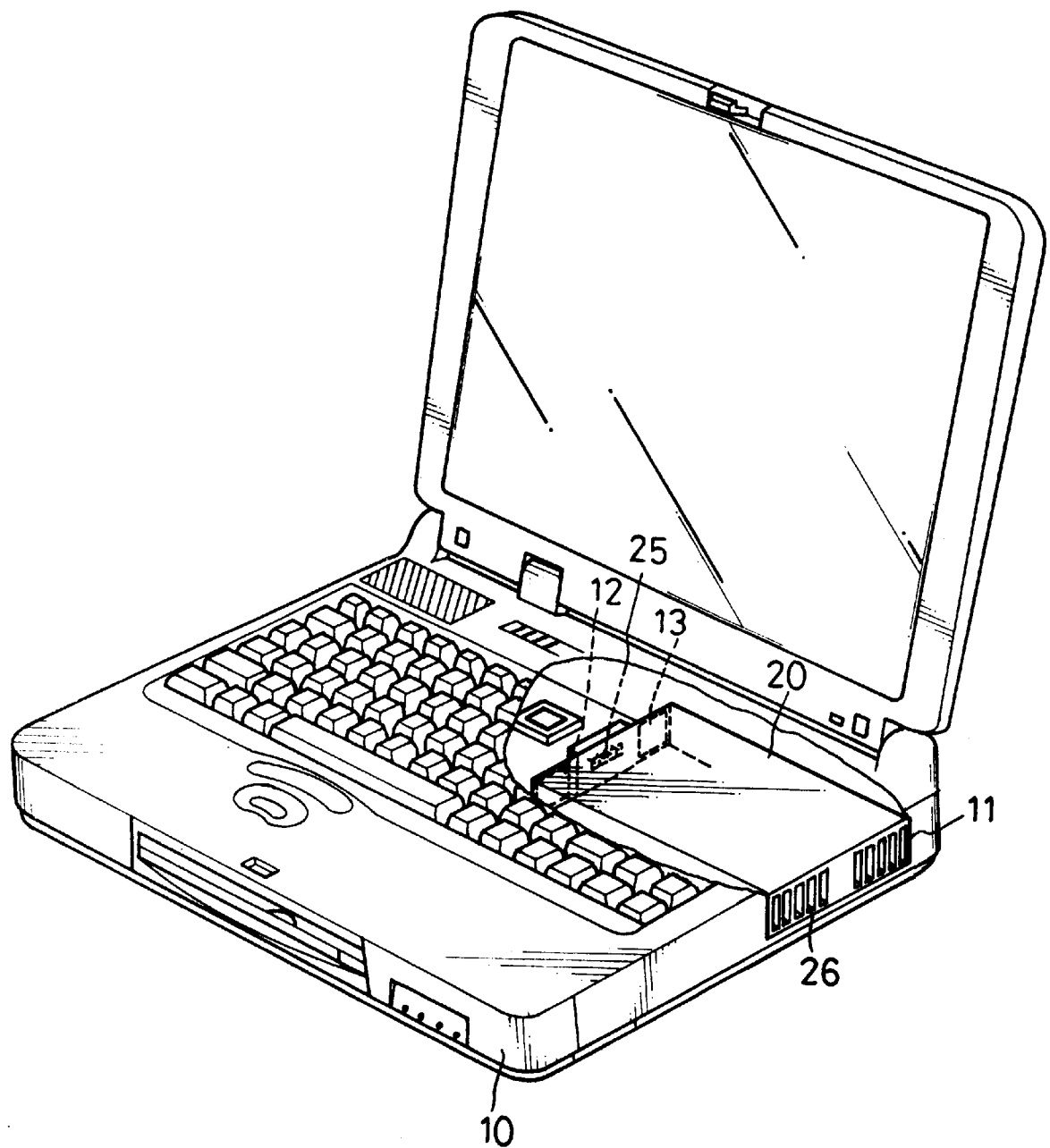
FIG. 4 is a perspective view of a notebook PC showing the heat dissipation cassette in accordance with the present invention installed in the notebook PC.

FIG. 4 shows that the notebook PC (10) has the heat dissipation cassette (20) installed in the battery chamber (11) thereof. The power connector (25) of the heat dissipation cassette (20) is thus plugged into the power socket of the notebook PC (10). Further, the notebook PC (20) has an air supply opening (12) and an air exhaust opening (13) defined in the endwall inside the battery chamber (11) so that the air supply channel (21) and the air exhaust channel (22) of the heat dissipation cassette (20) are aligned with the air supply opening (12) and air exhaust opening (13), respectively.

Accordingly, when the supply fan (23) and exhaust fan (24) start to rotate, the cold air outside the notebook PC (10) is blown into the notebook PC (20) via the air supply channel (21) and the air supply opening (12). The supply air flows to the electronic components inside the notebook PC (10) to cool down the operational temperature. Afterwards, the air is exhausted out of the notebook PC (10) via the air exhaust opening (12) and the air exhaust channel (21). Therefore, air is circulated to fully dissipate the heat generated by electronic components inside the notebook PC (10) whereby the heat dissipation efficiency is greatly increased and the notebook PC (10) can be maintained in a good operation condition.

Figure 5:
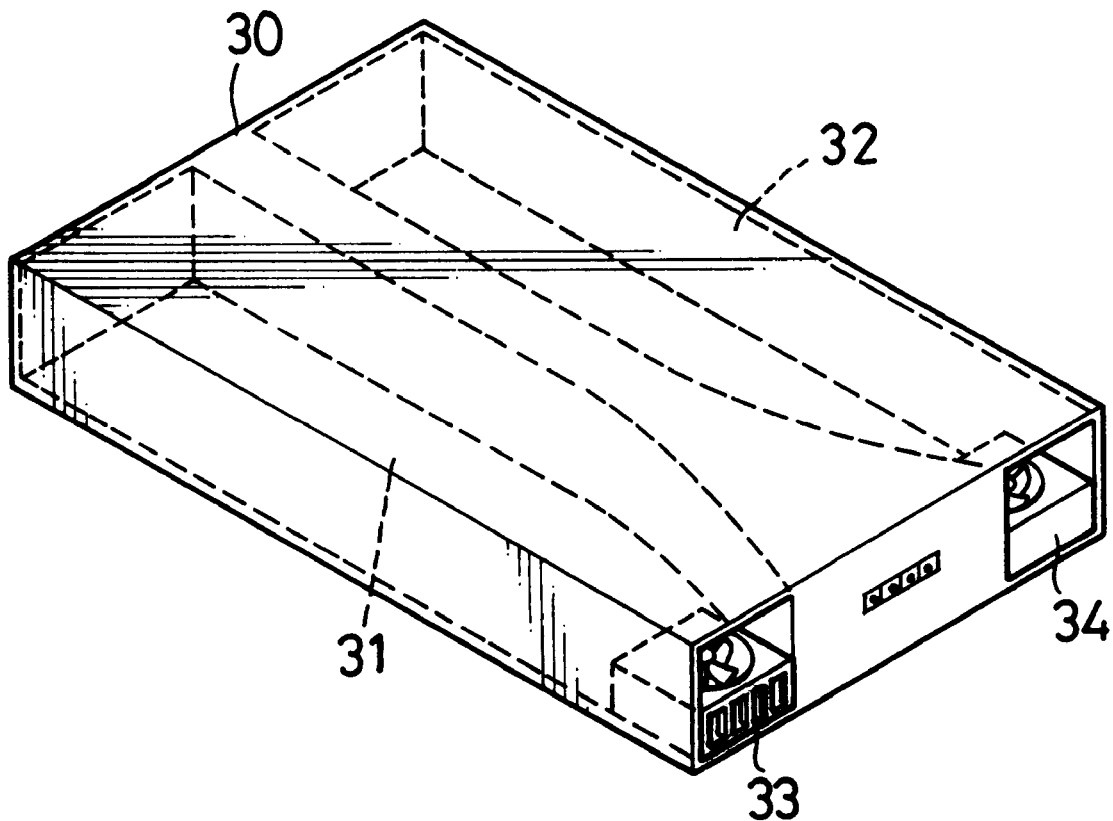
FIG. 5 is a perspective view of another preferred embodiment of the heat dissipation cassette in accordance with the present invention.
Figure 6:
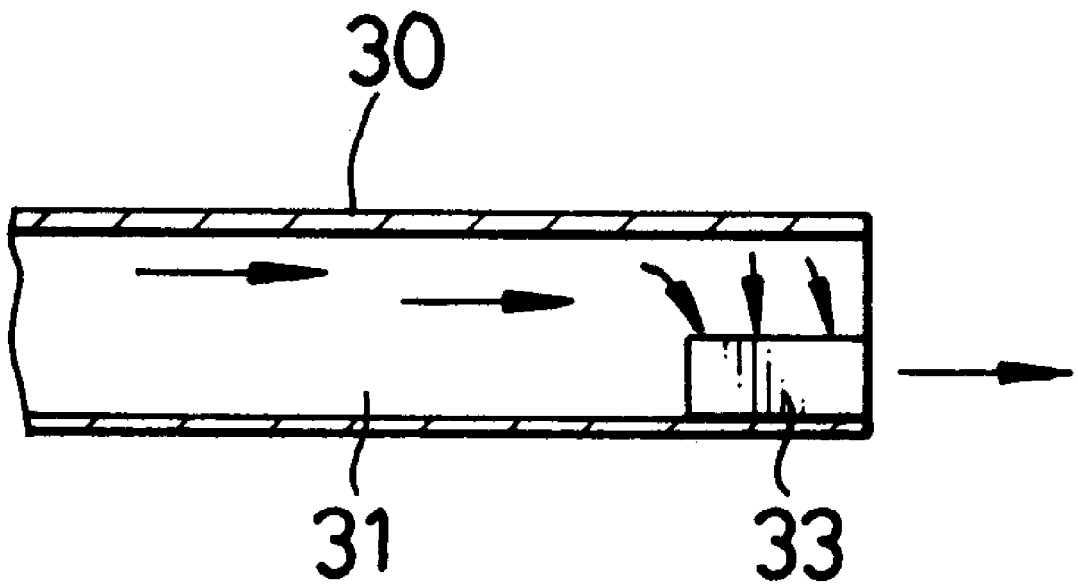
FIG. 6 is a side plan view in partial section of the heat dissipation cassette shown in FIG. 5 showing the internal structure and the direction of air flow in the heat dissipation cassette.
Figure 7:
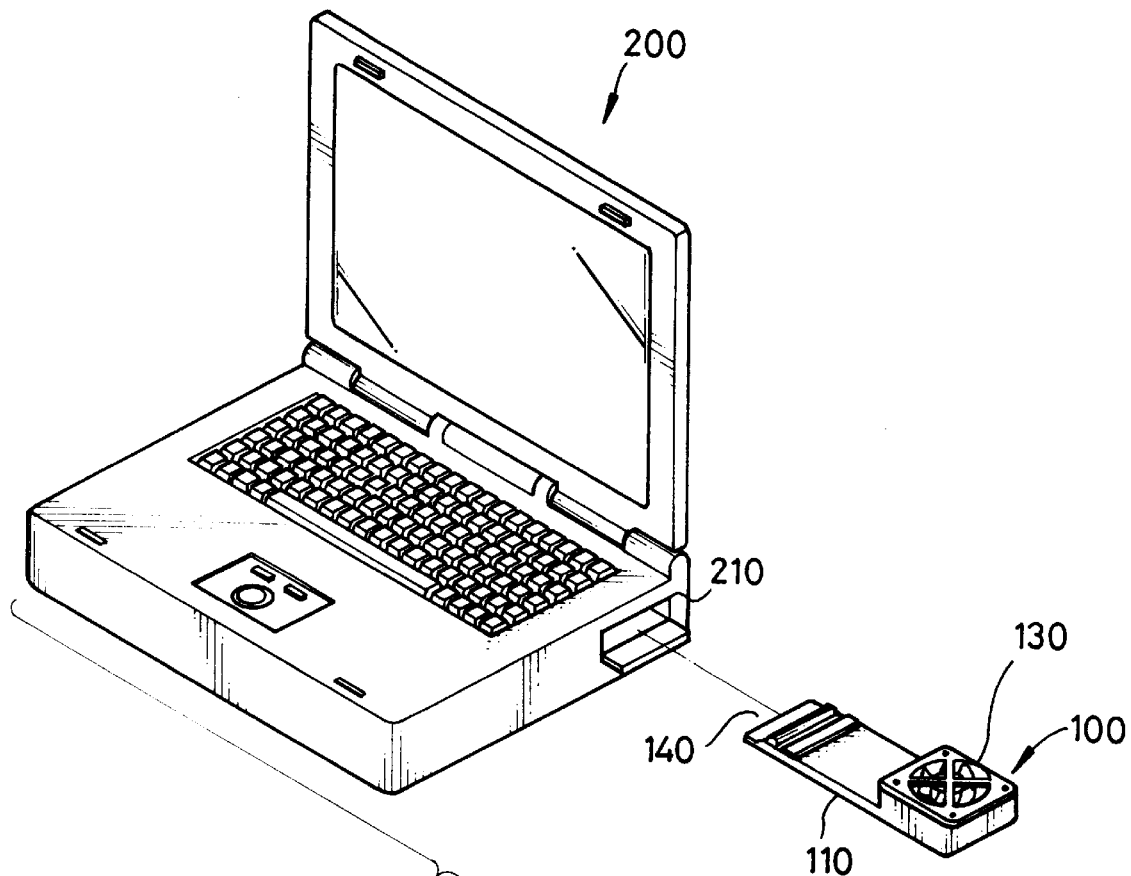
FIG. 7 is an exploded perspective view of a notebook PC showing a conventional heat dissipation device.

FIG. 5 shows another preferred embodiment of a heat dissipation cassette (30) in accordance with the present invention, which is similar to the heat dissipation cassette (20) except that the supply fan (33) and the exhaust fan (34) are arranged such that air is drawn in a vertical direction and exhausted in a horizontal direction, as shown in FIG. 6.

Although the present invention has been explained in relation to its preferred embodiment, it is to be understood that many other possible modifications and variations can be made without departing from the spirit and scope of the invention as hereinafter claimed.

What is claimed is:

1. A heat dissipation cassette to be installed in the battery chamber (11) of a notebook PC (10) for cooling down the internal operational temperature of the notebook PC (10), said notebook PC (10) defining an air supply opening (12) and an air exhaust opening (13) inside said battery chamber (11), said heat dissipation cassette comprising:

a cassette body (29) having an air supply channel (21) and an air exhaust channel (22) defined therein, said air supply channel (21) and said air exhaust channel (22) being adapted to align with said air supply opening (12) and said air exhaust opening (13), respectively;

a supply fan (23) mounted in said air supply channel (21) to supply cool air into said notebook PC (10) through said air supply channel (21) and said air supply opening (12); and an exhaust fan (24) mounted in said air exhaust channel (22) to exhaust hot air out of said notebook PC (10) through said air exhaust opening (13) and said air exhaust channel (22).

2. The heat dissipation cassette as claimed in claim 1, wherein said cassette body (29) is shaped to fit into said battery chamber (11).

3. The heat dissipation cassette as claimed in claim 2, wherein said cassette body (29) has an inner face (291) and an outer face (292) opposite to said inner face (291), and said air supply channel (21) and said air exhaust channel (22) are defined between said inner face (291) and said outer face (292).

4. The heat dissipation cassette as claimed in claim 3, wherein said supply fan (23) is located at one end of said air supply channel (21) which is on said inner face (291), and said exhaust fan (24) is located at one end of said air exhaust channel (22) which is on said inner face (291).

5. The heat dissipation cassette as claimed in claim 4, wherein said inner face (291) is provided with a power connector (25) adapted to be plugged into a power supply socket in said battery chamber (11) so that power can be supplied from said notebook PC (10) to said supply fan (23) and said exhaust fan (24).

6. The heat dissipation cassette as claimed in claim 4, wherein said supply fan (23) and said exhaust fan (24) are oriented to face in divergent directions, respectively.

* * * * *